United States Patent Office 3,137,680
Patented June 16, 1964

3,137,680
PROCESS FOR PREPARING STABLE DISPERSIBLE ACCELERATOR MASTERBATCH
Kermit V. Weinstock, Akron, Ohio, assignor to The General Tire and Rubber Company, Akron, Ohio, a corporation of Ohio
No Drawing. Filed July 6, 1953, Ser. No. 366,397
4 Claims. (Cl. 260—79.5)

The present invention relates to a method of preparing an easily dispersible vulcanizing type of accelerator for addition to rubber and rubber-like compounds. It particularly relates to easily dispersible tetra-methyl-thiuram polysulfide compositions.

The desirability of incorporating accelerators of vulcanization into rubber compounds by first preparing a master-batch of such accelerators (i.e., a rubber mixture containing dispersed therein a higher than normal concentration of accelerator) and then masticating the masterbatch into the desired rubber compound has long been recognized. The use of masterbatch technique is considered to provide a better degree of dispersion than is readily obtained by the addition of accelerator directed to the final rubber. It also prevents a high concentration of accelerator and curing agent from occurring at a given place.

Masterbatches of various accelerators have been made both by process of latex compounding wherein the accelerator is added to the latex and the coagulum dried and then masticated or masticated and dried and by the mass compounding process wherein the accelerator is merely mixed by mastication into solid rubber. While masterbatches of most accelerators prepared by either method are suitable for most purposes masterbatches of the class of rubber accelerators known as the substituted thiuram polysulfides when prepared have caused considerable difficulties. This class of accelerator is both an accelerator and vulcanizing agent. It carries its own sulfur so that when the concentration of accelerator is sufficiently large to provide the acceleration required when the masterbatch or accelerator is to be later added to rubber batches to prepare useable rubber compounds, curing of the rubber in the masterbatch has invariably taken place even at room temperature on standing with the result that the masterbatch itself could not be suitably dispersed in the rubber forming the base for the final useable compound. The alternative was to use the masterbatch quickly.

It is the object of the present invention to provide a masterbatch of solid thiuram polysulfide accelerators which may be stored for long periods of time without causing incipient vulcanization of the rubber thereof, even though the percentage of accelerator to rubber in the masterbatch is large.

It is another object of the present invention to provide a method of making in easily dispersible solid thiuram polysulfide accelerator-rubbery polymer compositions suitable for incorporation into rubber compounds to provide thiuram polysulfide acceleration thereof which easily dispersible compositions do not deteriorate upon relatively long storage such as one year or even more.

I have found that the above and other objects which will be apparent from the following description of the invention may be accomplished by incorporating the thiuram polysulfide accelerator into an aqueous dispersion of a vulcanizable rubbery polymer, coagulating the resultant mixture and drying the coagulum at a temperature below that of which melting of the accelerator can occur and maintaining the coagulum in unmasticated form. I have found that solid water-insoluble thiuram polysulfides, when thus incorporated apparently do not get into vulcanizing contact with rubber particles of the latex coagulum unless the coagulum is either subjected to temperatures above the melting point of the solid thiuram polysulfide accelerator or is subjected to mastication to cause smearing of the accelerator particles into vulcanizing contact with the rubber. Accelerator masterbatches of tetramethyl-thiuram disulfide, for example, prepared by the above outlined prior methods either by incorporation first with the latex or first in solid rubber by the mastication route, were completely set up and unuseable after a month's storage at room temperature; whereas masterbatches prepared by the process of the present invention, where neither mastication or drying at sufficiently elevated temperatures to cause melting of the accelerator was used in their preparation, had when stored for 18 months no perceptible set up and were in excellent condition.

The accelerators suitable for use in the present invention are any of the organo thiuram polysulfides including the tetramethyl thiuram disulfide which melts at a melting point of about 146° C. to 148° C. the dipentamethylene thiuram tetrasulfide having a melting point of 112° C., and tetra-methyl thiuram tetrasulfide and any other solid water insoluble organo thiuram polysulfides.

In the operation of the masterbatches of the present invention the accelerator is made of an aqueous slurry by either wetting the dry powder with sufficient water to completely wet the particles thereof or preferably making a slurry of the previously undried filter cake obtained from the preparation of the accelerator. When the undried filter cake is utilized, an exceedingly small particle size and superior dispersion is had without necessity for a grinding or ball milling operation. Such a dispersion is more desirable than one obtained by using a slurry formed by simply wetting and pulverizing a previously dried accelerator although the latter may be used to prepare the slurry. The amount of water required in the slurry is not critical except that it is desirable that the particles be completely wetted so that they will be miscible with the latex without causing incipient coagulation and a thin paste-like slurry is usually preferred. The latex utilized as a binding agent for the masterbatch may be any rubbery material or synthetic rubber available in latex form. Suitable rubbers include the polymers and copolymers of diolefinic compounds such as butadiene, isoprene, chloroprene, and the copolymers of one or more such olefinic compounds with one or more copolymerizable mono-olefines such as the hydrocarbon olefines, styrene and alpha methyl styrene, vinyl toluene, substituted olefines such as chlorinated styrenes, acrylo and methacrylonitriles, methyl methacrylate and other esters and amides of acrylic and methacrylic acids, methyl-vinyl and methyl-isopropenyl ketones, vinyl pyridine and the like. The term polymer is used herein in its broadest extent to include copolymers and the term polymer of a diolefinic compound is intended to include natural rubber (polyisoprene) and the other high molecular weight sulfur vulcanizable polymers as well as copolymers of such compounds.

The proportion of rubber latex to accelerator in the masterbatch may vary widely as desired, the higher the percentage of rubber therein the easier is the dispersion of the accelerator in the rubber mix without danger of local curing during the masticating process. It is generally uneconomical to use less than 25% of accelerator in the masterbatch composition and the benefits of dispersion and low concentration of masterbatches are decreased too greatly for most applications when the amount of the accelerator in the masterbatches is much greater than 75% of the weight of the masterbatch. In making the masterbatch the proportions of the latex and of the slurry are preferably selected so that the solids and the latices will be in the above percentage limits. All of the solids are considered in the coagulum upon coagulation of the latex mixture.

The slurry of the accelerator and of the latex are thoroughly mixed and the mixture thereafter coagulated by any desirable method as for example simply by making the latex mixture unstable as by the addition thereto of electrolyte such as an acid and/or salt such as aluminum sulfate, sodium chloride and acetic acid or the like. Coagulation may also be accomplished without the use of these coagulating agents by simply drying the latex-vulcanizing agent mixture in a thin form section under a reduced pressure to remove water. By utilizing a relatively large amount of the accelerator having a small particle size, the surface area of the accelerator is sufficiently large to provide a coagulum in the form of a crum which dries relatively easy and is exceptionally desirable from the standpoint of ease of dispersion when the masterbatch is added as a compounding agent in the preparation of rubber mixes. During drying it is exceptionally important that the temperature be maintained below the melting point and preferably below the softening point of the accelerator. In the case of the lower melting accelerators, the commercial drying operations are generally accomplished at reduced pressure and at a temperature which is only slightly elevated. Mastication of the coagulum, after drying has progressed to a considerable degree, is undesirable and is likely to cause vulcanizing contact of the rubber with the accelerator. Some mastication before the material is coagulated to a relatively solid state may be accomplished without this result, however.

The following examples in which parts are by weight illustrate the present invention.

*Example 1*

| | Parts |
|---|---|
| Wet filter cake of tetramethyl-thiuram disulfide containing about 67% solids and about 33% water) | 300 |
| Butadiene-styrene copolymer latex (having about 28% combined styrene and containing about 33% solids | 600 |
| Water | 400 |

The wet filter cake is mixed into the water to form a slurry and a slurry is then added with stirring to the above latex. After the latex and the slurry are thoroughly mixed, 200 parts of a 10% solution of sodium chloride is added to the above mixture with stirring and a 3% solution of sulfuric acid is stirred into the mixture a little at a time until coagulation is complete. The coagulum is then separated from the liquid by filtering and the coagulum washed by spraying it with water while it is on the filter. The filtered product thus obtained is placed upon trays in a vacuum oven, heated to 80° C. under reduced pressure preferably about 100 mm. of mercury or less, until drying of the coagulum is substantially complete. The coagulum thus obtained is packed in bags for sale as a masterbatch.

A sample taken from the masterbatch above prepared was placed in a polyethylene bag and stored for one and one-half years at room temperature. When, after this elapsed time, it was examined it showed no signs of any deterioration whatsoever. It dispersed very readily in rubber and had high acceleration activity.

*Example 2*

The wet filter cake in the above Example 1 was substituted by 200 parts of pulverized tetramethyl thiuram disulfide. This material was then stirred into 500 parts of water containing .5% of the wetting agent such as Santomerse, an allyl substituted aryl sulfonate, dissolved therein. The slurry was then mixed with GR-S type 2 latex in the same manner as was the slurry of Example 1. Other conditions remained substantially the same. The coagulum obtained after drying at a temperature well below 100° C. is easily dispersible in rubber and has exceptional storage ability. The particle size of the masterbatch was somewhat larger in the case of Example 2 than in the case of Example 1. All or part of the tetramethyl thiuram disulfide in the above example or any of the other water insoluble organo thiuram disulfide accelerators may be substituted to provide masterbatches suitable for compounding into rubber mixes.

The tetramethyl-thiuram disulfide is the preferred accelerating material, however. The latex used in the above example may be substituted by latices of other rubbery polymers of conjugated diolefinic compounds of less than 8 aliphatic carbon atoms, either natural or synthetic as above mentioned, rubber polymers being here considered as those which are vulcanizable (of course after suitable compounding) to a soft rubbery state.

It is to be understood that in accordance with the provisions of the patent statutes variations and modifications of the specific invention herein shown and described may be made without departing from the spirit of the invention.

What I claim is:

1. A process of making a masterbatch of a curing type of accelerator stable for extended periods at room temperature which comprises mixing a latex of a vulcanizable rubbery polymer of a conjugated diolefinic compound of less than 8 carbon atoms with an aqueous slurry of an organic thiuram polysulfide accelerator, coagulating the mixture thus formed, separating water from the coagulum while maintaining a temperature below the melting point of said thiuram polysulfide and maintaining said polymer in an unmasticated condition.

2. The process of claim 1 wherein said organic thiuram polysulfide is tetramethyl thiuram disulfide and where the weight of solids of said polymer is 1/3 to 3 times the weight of said organic polysulfide accelerator.

3. The process of claim 1 wherein said organic thiuram polysulfide is tetramethyl thiuram disulfide and said polymer is a copolymer of butadiene and styrene.

4. The process according to claim 1 wherein said polymer is a hydrocarbon rubbery polymer and where the amount of said polymer is at least 1/3 the weight of the accelerator.

References Cited in the file of this patent

UNITED STATES PATENTS

| 1,991,367 | Beck et al. | Feb. 19, 1935 |
| 2,598,209 | Bartram | May 27, 1952 |
| 2,640,088 | Glenn et al. | May 26, 1953 |
| 2,653,924 | Olin | Sept. 29, 1953 |
| 2,653,925 | Olin | Sept. 29, 1953 |

OTHER REFERENCES

Morrison et al.: Transactions, I.R.I., May 3, 1946, pp. 189–196.